US008732587B2

(12) United States Patent
Narayanan

(10) Patent No.: US 8,732,587 B2
(45) Date of Patent: May 20, 2014

(54) SYSTEMS AND METHODS FOR DISPLAYING TRUSTWORTHINESS CLASSIFICATIONS FOR FILES AS VISUALLY OVERLAID ICONS

(75) Inventor: Aravinthan Narayanan, West KK Nagar (IN)

(73) Assignee: Symantec Corporation, Mountain View, CA (US)

( * ) Notice: Subject to any disclaimer, the term of this patent is extended or adjusted under 35 U.S.C. 154(b) by 230 days.

(21) Appl. No.: 13/103,031

(22) Filed: May 6, 2011

(65) Prior Publication Data

US 2012/0246598 A1 Sep. 27, 2012

(30) Foreign Application Priority Data

Mar. 21, 2011 (IN) .............................. 370/KOL/2011

(51) Int. Cl.
*G06F 3/00* (2006.01)
(52) U.S. Cl.
USPC ............................ 715/745; 715/846; 715/837
(58) Field of Classification Search
USPC .......................................... 715/846, 837, 745
See application file for complete search history.

(56) References Cited

U.S. PATENT DOCUMENTS

| 7,269,851 | B2 |   | 9/2007 | Ackroyd |  |
|---|---|---|---|---|---|
| 7,392,477 | B2 | * | 6/2008 | Plastina et al. ................ | 715/210 |
| 7,640,590 | B1 | * | 12/2009 | McCorkendale et al. ...... | 726/25 |
| 7,694,328 | B2 | * | 4/2010 | Joshi et al. ........................ | 726/2 |
| 7,979,544 | B2 | * | 7/2011 | Cancel et al. ................. | 709/224 |
| 8,256,000 | B1 | * | 8/2012 | Krishnappa ..................... | 726/24 |
| 2004/0119757 | A1 | * | 6/2004 | Corley et al. ................. | 345/837 |
| 2005/0149726 | A1 | * | 7/2005 | Joshi et al. ..................... | 713/164 |
| 2005/0283831 | A1 |   | 12/2005 | Ryu et al. |  |
| 2006/0253584 | A1 |   | 11/2006 | Dixon et al. |  |
| 2007/0168266 | A1 | * | 7/2007 | Questembert .................... | 705/35 |
| 2007/0179883 | A1 | * | 8/2007 | Questembert .................... | 705/39 |
| 2009/0049557 | A1 | * | 2/2009 | Friedman et al. ............... | 726/27 |
| 2009/0150812 | A1 | * | 6/2009 | Baker et al. .................... | 715/764 |
| 2010/0030894 | A1 | * | 2/2010 | Cancel et al. ................. | 709/224 |
| 2011/0067101 | A1 | * | 3/2011 | Seshadri et al. ................ | 726/22 |
| 2012/0246725 | A1 | * | 9/2012 | Osipkov .......................... | 726/23 |

OTHER PUBLICATIONS

Sourabh Satish; Systems and Methods for Determining and Quantifying the Impact of an Application on the Health of a System; U.S. Appl. No. 12/049,751, filed Mar. 17, 2008.
Sourabh Satish; Systems and Methods for Determining the Health Impact of an Application Based on Information Obtained From Like-Profiled Computing Systems; U.S. Appl. No. 12/056,379, filed Mar. 27, 2008.
Sourabh Satish; Social Trust Based Security Model; U.S. Appl. No. 11/394,846, filed Mar. 31, 2006.
Non-Final Office Action Received in Related U.S. Appl. No. 11/394,846; Mar. 6, 2009.

(Continued)

*Primary Examiner* — William Titcomb
(74) *Attorney, Agent, or Firm* — ALG Intellectual Property, LLC

(57) ABSTRACT

A computer-implemented method for displaying trustworthiness classifications for files as visually overlaid icons may include (1) identifying a file, (2) identifying a file icon that graphically represents the file within a file manager interface on a computing device, (3) obtaining a trustworthiness classification assigned to the file that identifies the trustworthiness of the file, and then (4) visually overlaying the file icon with a trustworthiness icon that graphically represents the trustworthiness classification assigned to the file. Various other systems, methods, and computer-readable media are also disclosed.

20 Claims, 6 Drawing Sheets

(56) References Cited

OTHER PUBLICATIONS

Final Office Action Received in Related U.S. Appl. No. 11/394,846; Sep. 1, 2009.
Non-Final Office Action Received in Related U.S. Appl. No. 11/394,846; Feb. 23, 2010.
Final Office Action Received in Related U.S. Appl. No. 11/394,846; Jul. 22, 2010.
Non-Final Office Action Received in Related U.S. Appl. No. 11/394,846; Dec. 9, 2010.
Carey Nachenberg; Systems and Methods for Using Reputation Data to Detect Shared-Object-Based Security Threats; U.S. Appl. No. 12/415,834, filed Mar. 31, 2009.
Daniel Asheghian; Methods and Systems for Evaluating the Health of Computing Systems Based on When Operating-System Changes Occur; U.S. Appl. No. 12/476,782, filed Jun. 2, 2009.
William E. Sobel; Systems and Methods for Digitally Signing Executables with Reputation Information; U.S. Appl. No. 12/858,085, filed Aug. 17, 2010.
Himanshu Dubey; Systems and Methods for Generating Reputation-Based Ratings for Uniform Resource Locators; U.S. Appl. No. 13/101,472, filed May 5, 2011.

\* cited by examiner

SYSTEMS AND METHODS FOR DISPLAYING TRUSTWORTHINESS CLASSIFICATIONS FOR FILES AS VISUALLY OVERLAID ICONS

BACKGROUND

Security software may attempt to determine the trustworthiness of a file using various heuristics and/or based on various community-supplied information about the file. For example, security software may attempt to determine whether a file is malicious by determining whether the file matches a unique digital signature or fingerprint associated with a known-malicious file. Additionally or alternatively, the security software may attempt to assess the trustworthiness of the file by obtaining a reputation score for the file from a reputation service. In this example, the reputation service may assign the reputation score to the file by collecting, aggregating, and analyzing data from potentially millions of user devices within a community (such as the user base of a security-software vendor) that identify, among other details, the file's origin, age, and prevalence within the community (such as whether the file is predominantly found on at-risk or "unhealthy" machines within the community).

Unfortunately, while a user may (in some cases) see the results of such a trustworthiness evaluation immediately upon its completion, the user may fail to recall the results of the trustworthiness evaluation at a future point in time (e.g., when viewing files within a file manager interface). Thus, the user may be unable to identify the trustworthiness of a file displayed within a file manager interface without requesting a separate evaluation of the file's trustworthiness. Consequently, if the user fails to request a separate trustworthiness evaluation prior to opening or executing a file, the user may unknowingly open or execute a file that is less trustworthy than another file that performs a substantially similar function. For example, the user may unknowingly execute a calculator application that is less trustworthy than another calculator application stored in the same directory.

As such, the instant disclosure identifies a need for systems and methods for enabling users to quickly and easily identify (and/or compare) the trustworthiness of files without having to request a separate evaluation of the files' trustworthiness.

SUMMARY

As will be described in greater detail below, the instant disclosure generally relates to systems and methods for displaying trustworthiness classifications for files as visually overlaid icons. In one example, a shell extension (such as a security plug-in) for a file manager interface may accomplish such a goal by (1) identifying a file icon that graphically represents a file within a file manager interface (such as MICROSOFT WINDOWS EXPLORER) on a computing device, (2) obtaining a trustworthiness classification assigned to the file that identifies the trustworthiness or reputation of the file, and then (3) visually overlaying the file icon with a trustworthiness icon that graphically represents the trustworthiness classification assigned to the file. In this example, the trustworthiness icon may enable a user of the computing device to quickly and easily visually identify the file's trustworthiness or reputation without having to request a separate evaluation of the file.

As will be explained in greater detail below, by visually overlaying file icons with corresponding trustworthiness icons, the various systems and methods described herein may enable users to visually identify (and/or compare) the trustworthiness or reputations of files within a file manager interface without having to request separate trustworthiness evaluations of the same.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
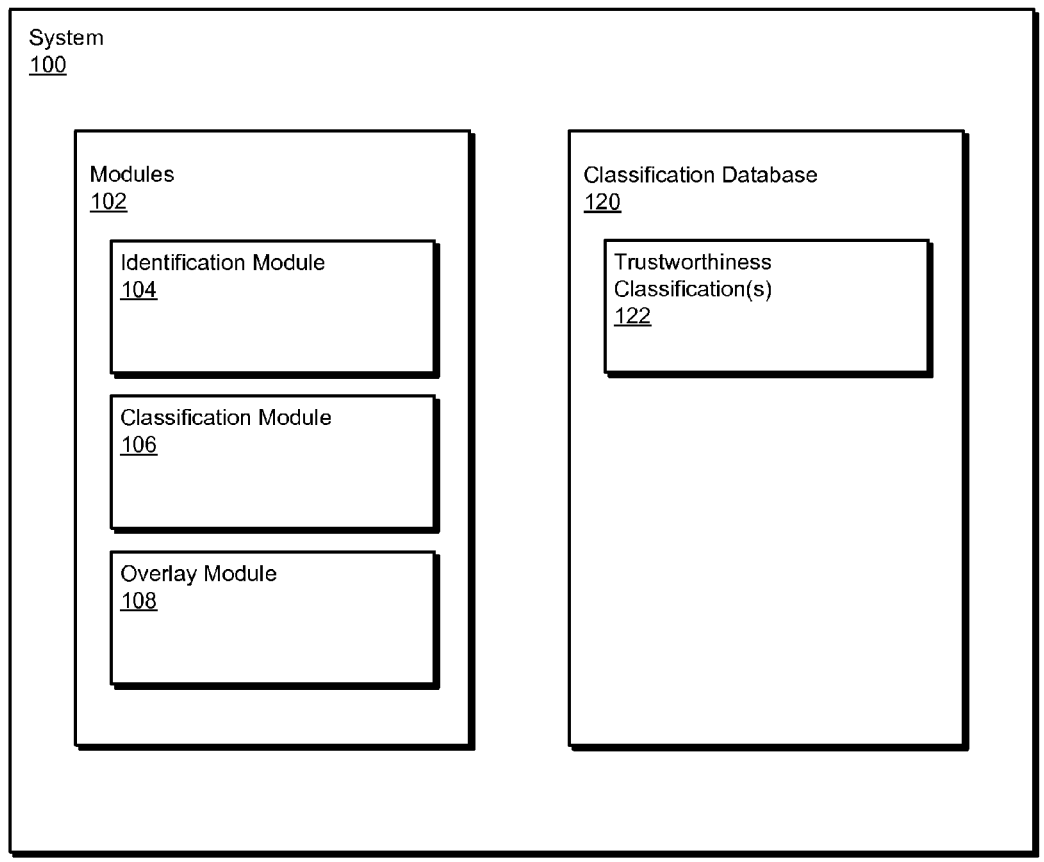
FIG. 1 is a block diagram of an exemplary system for displaying trustworthiness classifications for files as visually overlaid icons.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for displaying trustworthiness classifications for files as visually overlaid icons. The following will provide, with reference to FIG. 1, detailed descriptions of exemplary systems for displaying trustworthiness classifications for files as visually overlaid icons. Detailed descriptions of corresponding computer-implemented methods will also be provided in connection with FIGS. 2-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for displaying trustworthiness classifications for files as visually overlaid icons. As illustrated in this figure, exemplary system 100 may include one or more modules 102 for performing one or more tasks. For example, and as will be explained in greater detail below, exemplary system 100 may include an identification module 104 programmed to identify a file icon that graphically represents a file within a file manager interface. Exemplary system 100 may also include a classification module 106 programmed to obtain a trustworthiness classification assigned to the file that identifies the trustworthiness or reputation of the file.

In addition, and as will be described in greater detail below, exemplary system 100 may include an overlay module 108 programmed to visually overlay the file icon with a trustworthiness icon that graphically represents the trustworthiness classification assigned to the file. Although illustrated as separate elements, one or more of modules 102 in FIG. 1 may represent portions of a single module or application (such as a shell extension, a security plug-in, or a file manager interface).

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as computing system 510 in FIG. 5 and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as classification database 120. Classification database 120 may represent portions of a single database or computing device or a plurality of databases or computing devices. In one embodiment, and as will be explained in greater detail below, classification database 120 may store trustworthiness classifications 122 assigned to files.

Classification database 120 in FIG. 1 may represent a portion of one or more computing devices. For example, classification database 120 may represent a portion of computing system 510 in FIG. 5 and/or portions of exemplary network architecture 600 in FIG. 6. Alternatively, classification database 120 in FIG. 1 may represent one or more physically separate devices capable of being accessed by a computing device, such as computing system 510 in FIG. 5 and/or portions of exemplary network architecture 600 in FIG. 6.

Exemplary system 100 in FIG. 1 may be deployed in a variety of ways. In one example, all or a portion of exemplary system 100 may represent portions of computing system 510 in FIG. 5. For example, and as will be described in greater detail below, in some examples modules 102 may program computing system 510 to display trustworthiness classifications assigned to files as visually overlaid icons by (1) identifying a file icon that graphically represents a file within a file manager interface (such as file manager interface 400 in FIG. 4) on computing system 510, (2) obtaining a trustworthiness classification assigned to the file (from, e.g., classification database 120 in FIG. 1) that identifies the trustworthiness or reputation of the file, and then (3) visually overlaying the file icon with a trustworthiness icon that graphically represents the trustworthiness classification assigned to the file.

Figure 2:
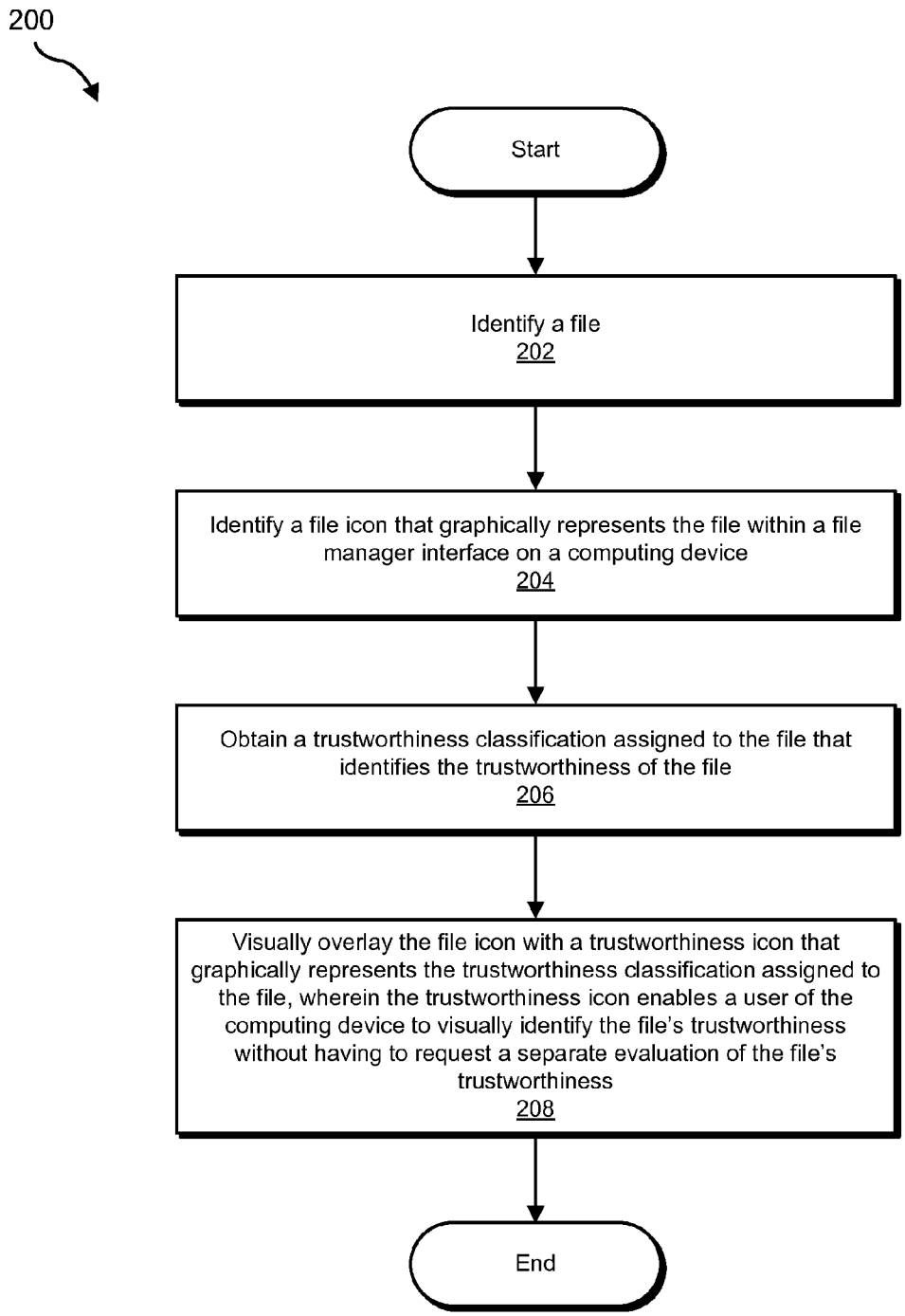
FIG. 2 is a flow diagram of an exemplary method for displaying trustworthiness classifications for files as visually overlaid icons.

FIG. 2 is a flow diagram of an exemplary computer-implemented method 200 for displaying trustworthiness classifications for files as visually overlaid icons. The steps shown in FIG. 2 may be performed by any suitable computer-executable code and/or computing system. In some embodiments, the steps shown in FIG. 3 may be performed by one or more of the components of system 100 in FIG. 1, computing system 510 in FIG. 5, and/or exemplary network architecture 600 in FIG. 6.

As illustrated in FIG. 2, at step 202 the various systems described herein may identify a file. For example, identification module 104 may, as part of computing system 510 in FIG. 5, identify a file encountered by computing system 510.

The systems described herein may perform step 202 in a variety of ways. In one example, identification module 104 may identify a file upon observing or detecting creation of the file. For example, identification module 104 may identify an executable file that is created and stored within a directory on computing system 510 as part of an installation process. In another example, identification module 104 may identify a file within a directory as an application (or operating system) analyzes the contents of the directory prior to causing the contents of the directory to be displayed within a file manager interface (such as file manager interface 400 in FIG. 4). Identification module 104 may also identify files upon encountering the same on local and/or remote storage devices (e.g., files stored on removable storage devices and/or remote servers). The file identified in step 202 may be any type of file, including an executable file or a dynamic-link library file.

Returning to FIG. 2, at step 204 the various systems described herein may identify a file icon used to graphically represent the file within a file manager interface on a computing device. For example, identification module 104 may, as part of computing system 510 in FIG. 5, identify a file icon 302 in FIGS. 3 and 4 that is used to graphically represent the file "Wincalc.exe" within file manager interface 400 in FIG. 4.

The term "file icon," as used herein, generally refers to any type or form of pictogram used to visually or graphically represent an object (such as a file, folder, application, device, etc.) within a graphical user interface of a computing system. As will be explained in greater detail below, file icons may graphically represent objects using any of a variety of shapes, text, sizes, colors, and/or animations.

In addition, the term "file manager interface," as used herein, generally refers to any type or form of user interface for enabling users to view and/or manipulate files within a file system. File manager interfaces may display various images that graphically represent one or more files, relative or absolute paths, computing resources, and/or any other type of suitable information. In some examples, file manager interfaces may be presented to a user of a computing system in response to one or more user actions (e.g., upon selecting an application icon that represents the file manager interface). Examples of file manager interfaces include, without limitation, orthodox file managers (such as MICROSOFT SE-EXPLORER or WINSCP), navigational file managers (such as MICROSOFT WINDOWS EXPLORER or MAC OS X FINDER), spatial file managers, 3D file managers, web-based file managers, or any other suitable type of file manager or user interface.

The systems described herein may perform step 204 in a variety of ways. In one example, identification module 104 may identify a file icon associated with a file upon creation of the same by an application or operating system (e.g., during installation of the file or an application associated with the file). In other examples, identification module 104 may identify a file icon associated with a file upon encountering the file (e.g., upon encountering a file on a removable storage device and/or remote server).

Returning to FIG. 2, at step 206 the various systems described herein may obtain a trustworthiness classification assigned to the file that identifies the trustworthiness or reputation of the file. For example, classification module 106 may, as part of computing system 510 in FIG. 5, obtain a trustworthiness classification 310 in FIG. 3 for the executable file "Wincalc.exe" from classification database 120 in FIG. 1. In this example, trustworthiness classification 310 may include information that identifies a reputation of the executable file "Wincalc.exe" within a community, such as the user base of a security-software vendor.

The systems described herein may perform step 206 in a variety of ways. In one example, classification module 106 may obtain the trustworthiness classification from a local database, such as classification database 120 stored on computing system 510. In another example, classification module 106 may obtain the trustworthiness classification from a remote reputation service.

The term "trustworthiness classification," as used herein, generally refers to any type or form of information used to indicate or identify the trustworthiness or reputation of an object (such as a file, application, device, computing resource, etc.) within a community (such as the user base of a security-software vendor). As illustrated by exemplary trustworthiness classification 310 in FIG. 3, examples of the types of information that may be included within a trustworthiness classification include the name of a file (in this example, "Wincalc.exe"), a hash of the file (in this example, "0xAD93C931"), and/or a numeric trustworthiness score that represents the file's trustworthiness or reputation within a community (in this example, "99%"). In this example, a high trustworthiness score may indicate that a file is generally trusted within the community, and a low trustworthiness score may indicate that a file is generally untrusted within the community.

As will be explained in greater detail below, trustworthiness classifications may indicate that a particular file is trustworthy, untrustworthy, or that the file's trustworthiness is unknown. In various examples, trustworthiness classifications assigned to files may indicate that the files are untrustworthy even though the files are not necessarily malicious. For example, a reputation service may classify a non-malicious file as untrustworthy due to the file's poor performance (e.g., slow execution speed or high probability of failure), the file's poor design, or any other characteristic relevant to the file's trustworthiness.

In some embodiments, reputation services (such as server 640 in FIG. 6) may generate a trustworthiness classification for a file based at least in part on the file's location, origin, age, prevalence within a community, or any other characteristic relevant to classifying the trustworthiness of the file. Reputation services may generate trustworthiness classifications for files based at least in part on information that has been collected and aggregated from user devices within a community. Examples of information gathered from user devices within a community that may be used to generate trustworthiness classifications include, without limitation, information that identifies the overall health of a user device (e.g., information that identifies the performance, stability, and/or state of security of the user device), information that identifies one or more files stored on or encountered by a user device, information that identifies the impact of a file on the health of a user device (e.g., information that identifies the health of a user device both before and after a file is encountered by the user device), or any other information relevant to classifying the trustworthiness of a file.

In some examples, by collecting, aggregating, and analyzing this data from potentially millions of user devices within a community (such as the user base of a security-software vendor), a reputation service may be able to gain a fairly accurate understanding as to the trustworthiness of a file. In other examples, if little information exists on a particular file within a community (e.g., if the file's prevalence is low within the community), a reputation service may assign a trustworthiness classification to a file that indicates that the file's trustworthiness is unknown.

Returning to FIG. 2, at step 208 the various systems described herein may visually overlay the file icon with a trustworthiness icon that graphically represents the trustworthiness classification assigned to the file. For example, overlay module 108 may, as part of computing system 510 in FIG. 5, visually overlay file icon 302 in FIGS. 3 and 4 with a trustworthiness icon 304 that graphically represents the trustworthiness classification obtained in step 206. In this example, trustworthiness icon 304 may enable a user of computing system 510 to quickly and easily visually identify the file's trustworthiness (i.e., without having to request a separate evaluation of the file's trustworthiness).

The term "trustworthiness icon," as used herein, generally refers to any type or form of pictogram used to visually or graphically represent the trustworthiness of an object (such as a file, folder, application, device, computing resource, etc.) within a graphical user interface of a computing system. As will be explained in greater detail below, trustworthiness icons may graphically represent the trustworthiness of objects using any of a variety of shapes, texts, sizes, colors, and/or animations.

The systems described herein may perform step 208 in a variety of ways. In some examples, overlay module 108 may generate or identify a trustworthiness icon that graphically represents the trustworthiness classification identified in step 206. In such examples, upon generating or identifying the trustworthiness icon, overlay module 108 may overlay (or cause the file manager interface to overlay) the file icon identified in step 204 with the trustworthiness icon.

Figure 3:
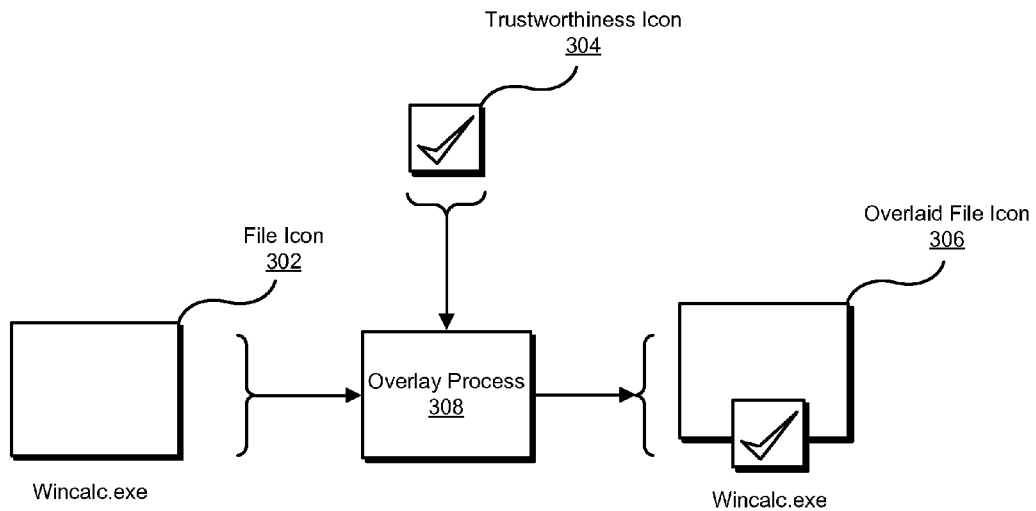
FIG. 3 is an illustration of an exemplary overlay process.
Figure 3:
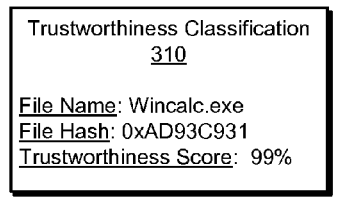

For example, upon determining that trustworthiness classification 310 in FIG. 3 obtained for the executable file "Wincalc.exe" indicates that the file is trustworthy, overlay module 108 may, as part of overlay process 308 in FIG. 3, (1) generate or identify a trustworthiness icon 304 that visually suggests that executable file "Wincalc.exe" is trustworthy and then (2) visually overlay file icon 302 with trustworthiness icon 304 to enable a user to visually identify that executable file "Wincalc.exe" is trustworthy without having to request a separate evaluation of the file's trustworthiness.

In one example, if the trustworthiness classification obtained in step 206 indicates that the file identified in step 202 is trustworthy, overlay module 108 may generate or identify a trustworthiness icon that visually suggests to a user that the file associated with the trustworthiness icon is trustworthy. For example, upon determining that trustworthiness classification 310 in FIG. 3 indicates that the executable file "Wincalc.exe" is trustworthy, overlay module 108 may generate and then overlay file icon 302 with a green-colored trustworthiness icon 304 that includes a check mark to visually convey that the file "Wincalc.exe" is trustworthy.

In contrast, if the trustworthiness classification indicates that the file identified in step 202 is untrustworthy, overlay module 108 may generate or identify a trustworthiness icon that visually suggests to a user that the file associated with the trustworthiness icon is untrustworthy. For example, upon determining that the trustworthiness classification associated with the executable file "Customcalc.exe" indicates that the file is untrustworthy, overlay module 108 may generate and then overlay file icon 410 in FIG. 4 with a red-colored trustworthiness icon 412 that includes an "X" to visually convey that the file "Customcalc.exe" is untrustworthy. In this example, the executable file "Customcalc.exe" may be a non-malicious file that implements a poorly designed calculator application when executed by computing system 510.

In another example, if the trustworthiness classification indicates that the trustworthiness of the file identified in step 202 is unknown, overlay module 108 may generate or identify a trustworthiness icon that visually suggests to a user that the trustworthiness of the file associated with the trustworthiness icon is unknown. For example, overlay module 108 may generate or identify a black-and-white colored trustworthiness icon that includes a question mark to visually convey that the trustworthiness of a file is unknown.

Figure 4:
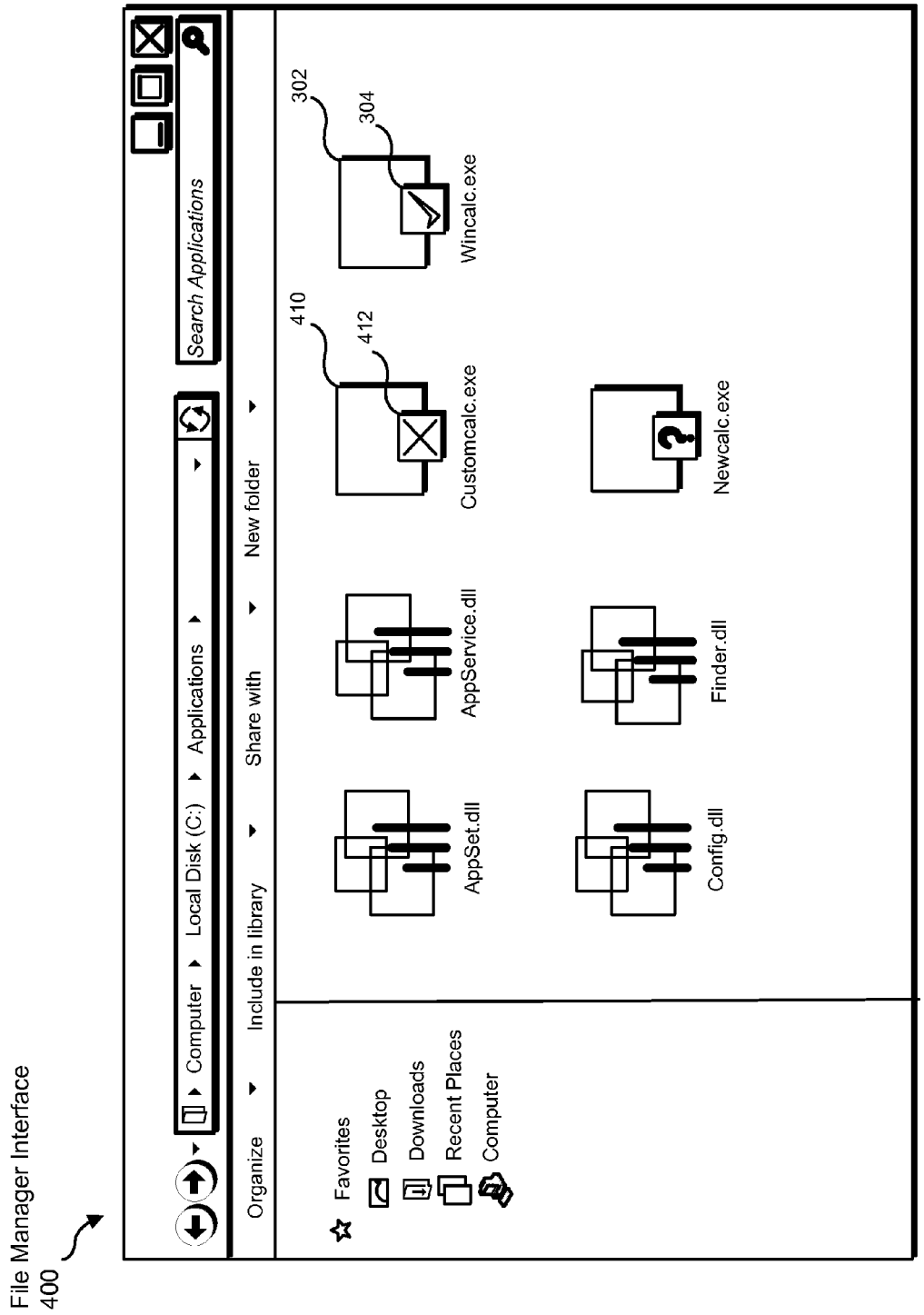
FIG. 4 is an illustration of an exemplary file manager interface including trustworthiness classifications for files displayed as visually overlaid icons.

In some embodiments, modules 102 may represent a portion of a shell extension within a file manager interface, such as file manager interface 400 in FIG. 4. The term "shell extension," as used herein, generally refers to any type of plug-in or software module configured to extend the functionality of a file manger interface beyond its default functionality. Such a shell extension may be provided as part of a third-party software package. For example, NORTON ANTIVIRUS may include and provide a shell extension configured to extend the functionality of MICROSOFT WINDOWS EXPLORER to overlay file icons with corresponding trustworthiness icons. In this example, the shell extension may cause MICROSOFT WINDOWS EXPLORER to visually overlay a file icon with a trustworthiness icon.

As detailed above, the various systems and methods described herein may enable users to visually compare the trustworthiness of files that perform substantially similar functions without having to request separate trustworthiness evaluations of the same. For example, a user may determine, by visually comparing trustworthiness icon 412 with trustworthiness icon 304 in FIG. 4, that the executable file "Wincalc.exe" represents a safer (or at least more reputable or trusted) calculator application than the executable file "Customcalc.exe." Thus, by visually overlaying file icons with corresponding trustworthiness icons, the various systems and methods described herein may enable users to visually identify (and/or compare) the trustworthiness of files within a file manager interface without having to request separate trustworthiness evaluations.

Figure 5:
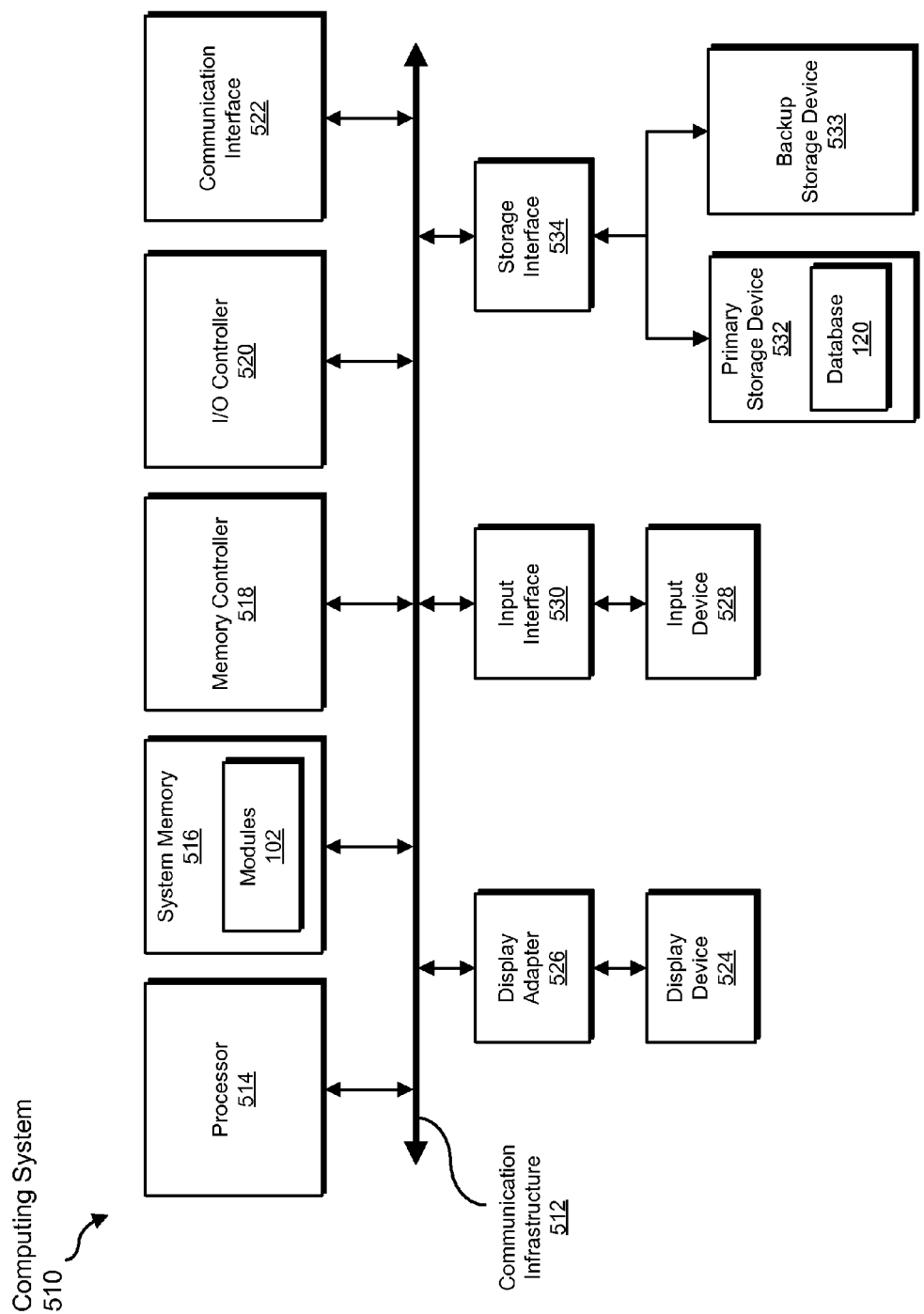
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, obtaining, visually overlaying, enabling, receiving, and providing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, obtaining, visually overlaying, enabling, receiving, and providing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, obtaining, visually overlaying, enabling, receiving, and providing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet.

Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, obtaining, visually overlaying, enabling, receiving, and providing steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, obtaining, visually overlaying, enabling, receiving, and providing steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, classification database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, obtaining, visually overlaying, enabling, receiving, and providing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
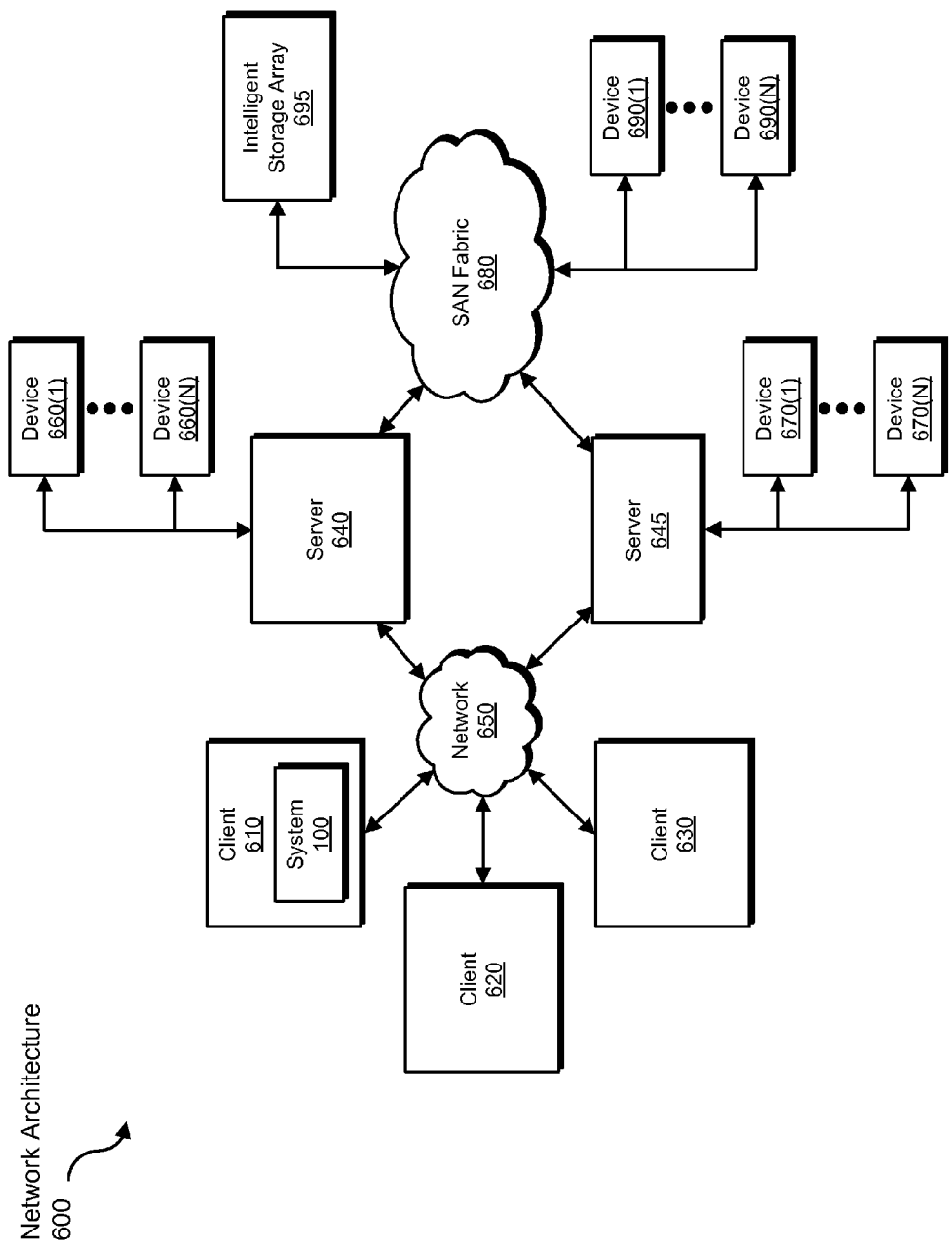
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, obtaining, visually overlaying, enabling, receiving, and providing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for displaying trustworthiness classifications for files as visually overlaid icons. For example, computing system 510 may identify a file and a file icon that graphically represents the file within a file manager interface on the computing device.

In some embodiments, computing system 510 may obtain a trustworthiness classification assigned to the file that identifies the trustworthiness of the file. The trustworthiness classification may indicate that the file is trustworthy, untrustworthy, or that the file's trustworthiness is unknown. Computing system 510 may then visually overlay the file icon with a trustworthiness icon that graphically represents the trustworthiness classification assigned to the file. For example, computing system 510 may provide a shell extension for the file manager interface that causes the file manager interface to visually overlay the file icon with the trustworthiness icon. This trustworthiness icon may enable a user of the computing device to visually identify the file's trustworthiness without having to request a separate evaluation of the file's trustworthiness.

In one or more embodiments, computing system 510 may obtain the trustworthiness classification assigned from a reputation service. In such embodiments, this trustworthiness classification assigned to the file may include information that identifies a reputation of the file within a community. The trustworthiness classification assigned to the file may also be represented by a numeric score that identifies the file's trustworthiness.

In at least one embodiment, computing system 510 may identify an additional file and an additional file icon that graphically represents the additional file within the same file manager interface as the file icon. Computing system 510 may obtain an additional trustworthiness classification assigned to the additional file that identifies the trustworthiness of the additional file. Computing system 510 may then visually overlay the additional file icon with an additional trustworthiness icon that graphically represents the additional trustworthiness classification assigned to the additional file. This additional trustworthiness icon may be juxtaposed with the trustworthiness icon to enable the user to visually compare the additional file's trustworthiness with the file's trustworthiness without having to request a separate evaluation of the additional file's trustworthiness.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of modules 102 in FIG. 1 may transform a characteristic or property of a physical device (such as display device 524 in FIG. 5) by visually overlaying file icons with trustworthiness icons.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for enabling users of computing devices to visually identify the relative trustworthiness of files without having to request separate trustworthiness evaluations of the files by displaying trustworthiness classifications for files as visually overlaid icons, at least a portion of the method being performed by at least one computing device comprising at least one processor, the method comprising:

identifying, at a shell extension within a file manager installed on the computing device:
  a first file;
  a second file that performs a substantially similar function to the first file;
in response to identifying the first and second files, allowing a user of the computing device to visually compare the trustworthiness of the first and second files without requiring the user to request a separate evaluation of the files' trustworthiness by:
  identifying, at the shell extension:
    a first file icon that graphically represents the first file within a file manager interface;
    a second file icon that graphically represents the second file within the same file manager interface;
  obtaining, at the shell extension:
    a first trustworthiness classification assigned to the first file that identifies the trustworthiness of the first file;
    a second trustworthiness classification assigned to the second file that identifies the trustworthiness of the second file;
  visually overlaying, at the shell extension:
    the first file icon with a first trustworthiness icon that graphically represents the trustworthiness classification assigned to the first file;
    the second file icon with a second trustworthiness icon that graphically represents the second trustworthiness classification assigned to the second file.

2. The computer-implemented method of claim 1, wherein the first and second trustworthiness classifications assigned to the first and second files indicate that at least one of:
the first or second file's trustworthiness is unknown;
the first or second file is untrustworthy;
the first or second file is trustworthy.

3. The computer-implemented method of claim 1, wherein the first trustworthiness icon visually overlaid on the first file icon is juxtaposed with the second trustworthiness icon visually overlaid on the second file icon.

4. The computer-implemented method of claim 1, wherein:
visually overlaying the first file icon with the first trustworthiness icon comprises generating a single overlaid file icon that comprises both the first file icon and the first trustworthiness icon;
visually overlaying the second file icon with the second trustworthiness icon comprises generating a single overlaid file icon that comprises both the second file icon and the second trustworthiness icon.

5. The computer-implemented method of claim 1, wherein the first and second trustworthiness classifications assigned to the first and second files comprise information that identifies a reputation of the first or second file within a community.

6. The computer-implemented method of claim 1, wherein obtaining the first and second trustworthiness classifications assigned to the first and second files comprises receiving the first and second trustworthiness classifications from a reputation service.

7. The computer-implemented method of claim 1, wherein identifying the first and second files comprises identifying files that are created as part of an installation process.

8. The computer-implemented method of claim 1, wherein identifying the first and second files comprises identifying a directory comprising the first and second files and analyzing contents of the directory prior to causing the contents of the directory to be displayed within the file manager interface.

9. A system for enabling users of computing devices to visually identify the relative trustworthiness of files without having to request separate trustworthiness evaluations of the files by displaying trustworthiness classifications for files as visually overlaid icons, the system comprising:
an identification module, a classification module, and an overlay module collectively programmed to:

identify, at a shell extension within a file manager installed on a computing device:
a first file;
a second file that performs a substantially similar function to the first file;
in response to identifying the first and second files, allowing a user of the computing device to visually compare the trustworthiness of the first and second files without requiring the user to request a separate evaluation of the files' trustworthiness by:
identifying, at the shell extension:
a first file icon that graphically represents the first file within a file manager interface on the computing device;
a second file icon that graphically represents the second file within the same file manager interface;
obtaining, at the shell extension:
a first trustworthiness classification assigned to the first file that identifies the trustworthiness of the first file;
a second trustworthiness classification assigned to the second file that identifies the trustworthiness of the second file;
visually overlaying, at the shell extension;
the first file icon with a first trustworthiness icon that graphically represents the first trustworthiness classification assigned to the first file;
the second file icon with a second trustworthiness icon that graphically represents the second trustworthiness classification assigned to the second file;
at least one processor configured to execute the identification module, the classification module, and the overlay module.

10. The system of claim 9, wherein the first and second trustworthiness classifications assigned to the first and second files indicate that at least one of:
the first or second file's trustworthiness is unknown;
the first or second file is untrustworthy;
the first or second file is trustworthy.

11. The system of claim 9,
wherein the first trustworthiness icon visually overlaid on the first file icon is juxtaposed with the second trustworthiness icon visually overlaid on the second file icon.

12. The system of claim 9, wherein the overlay module:
visually overlays the first file icon with the first trustworthiness icon by generating a single overlaid file icon that comprises both the first file icon and the first trustworthiness icon;
visually overlays the second file icon with the second trustworthiness icon by generating a single overlaid file icon that comprises both the second file icon and the second trustworthiness icon.

13. The system of claim 9, wherein the first and second trustworthiness classifications assigned to the first and second files comprise information that identifies a reputation of the first or second file within a community.

14. The system of claim 9, wherein the classification module is further programmed to receive the first and second trustworthiness classifications from a reputation service.

15. The system of claim 9, wherein the shell extension is provided as part of a third-party software package.

16. The system of claim 9, wherein the first and second trustworthiness classifications assigned to the first and second files are represented by a numeric score that identifies the first and second files' trustworthiness.

17. A non-transitory computer-readable-storage medium comprising one or more computer-executable instructions that, when executed by at least one processor of a computing device, cause the computing device to:
identify, at a shell extension within a file manager installed on the computing device:
a first file;
a second file that performs a substantially similar function to the first file;
in response to identifying the first and second files, allowing a user of the computing device to visually compare the trustworthiness of the first and second files without requiring the user to request a separate evaluation of the files' trustworthiness by:
identifying, at the shell extension;
a first file icon that graphically represents the first file within a file manager interface on the computing device;
a second file icon that graphically represents the second file within the same file manager interface;
obtaining, at the shell extension;
a first trustworthiness classification assigned to the first file that identifies the trustworthiness of the first file;
a second trustworthiness classification assigned to the second file that identifies the trustworthiness of the second file;
visually overlaying, at the shell extension;
the first file icon with a first trustworthiness icon that graphically represents the first trustworthiness classification assigned to the first file;
the second file icon with a second trustworthiness icon that graphically represents the second trustworthiness classification assigned to the second file.

18. The non-transitory computer-readable-storage medium of claim 17, wherein the first and second trustworthiness classifications assigned to the first and second files indicate that at least one of:
the first or second file's trustworthiness is unknown;
the first or second file is untrustworthy;
the first or second file is trustworthy.

19. The non-transitory computer-readable-storage medium of claim 17,
wherein the first trustworthiness icon visually overlaid on the first file icon is juxtaposed with the second trustworthiness icon visually overlaid on the second file icon.

20. The non-transitory computer-readable-storage medium of claim 17, wherein:
the first file icon is visually overlaid with the first trustworthiness icon by generating a single overlaid file icon that comprises both the first file icon and the first trustworthiness icon;
the second file icon is visually overlaid with the second trustworthiness icon by generating a single overlaid file icon that comprises both the second file icon and the second trustworthiness icon.

* * * * *

UNITED STATES PATENT AND TRADEMARK OFFICE
CERTIFICATE OF CORRECTION

| | |
|---|---|
| PATENT NO. | : 8,732,587 B2 |
| APPLICATION NO. | : 13/103031 |
| DATED | : May 20, 2014 |
| INVENTOR(S) | : Aravinthan Narayanan |

Page 1 of 1

It is certified that error appears in the above-identified patent and that said Letters Patent is hereby corrected as shown below:

In the Claims:

Claim 1, at column 14, lines 5 to 6, should read:
a first file icon that graphically represents the first file within a file manager interface on the computing device;

Claim 9, at column 15, lines 1 to 2, should read:
identify, at a shell extension within a file manager installed on a computing device:

Claim 9, at column 15, line 25, should read:
visually overlaying, at the shell extension:

Claim 17, at column 16, line 19, should read:
identifying, at the shell extension:

Signed and Sealed this
Fourteenth Day of October, 2014

Michelle K. Lee
*Deputy Director of the United States Patent and Trademark Office*